United States Patent [19]
Pipon et al.

[11] Patent Number: 5,050,932
[45] Date of Patent: Sep. 24, 1991

[54] SHAPED JUNCTION PORTIONS OF TUBES OF AN ARTICULATED SEAT FRAME

[75] Inventors: Yves Pipon; Georges Droulon, both of Flers, France

[73] Assignee: A. & M. Cousin-Etablissements Cousin Freres, Orne, France

[21] Appl. No.: 421,318

[22] Filed: Oct. 11, 1989

Related U.S. Application Data
[63] Continuation-in-part of Ser. No. 164,013, Mar. 4, 1988.

[30] Foreign Application Priority Data

Mar. 4, 1987 [FR] France ................................ 8702953

[51] Int. Cl.⁵ .............................................. A47C 1/024
[52] U.S. Cl. ..................... 297/355; 297/452; 297/443; 403/206; 403/404
[58] Field of Search ............... 297/452, 443, 362, 451, 297/354, 355; 403/206, 271, 404

[56] References Cited
U.S. PATENT DOCUMENTS

| 2,851,090 | 9/1958 | Hamilton | 297/451 |
| 4,470,633 | 9/1984 | Fourrey et al. | 297/362 |
| 4,473,318 | 9/1984 | Schrock | 403/206 |
| 4,492,408 | 1/1985 | Lohr | 297/452 |
| 4,575,153 | 3/1986 | Acki et al. | 297/452 |

FOREIGN PATENT DOCUMENTS 210469 1/1967 Sweden ................................ 403/199

Primary Examiner—Peter R. Brown
Attorney, Agent, or Firm—Robert W. Becker & Associates

[57] ABSTRACT

In the shaped junction portion, each end of the seat and back frame is deformed in order to obtain a flattened portion in a central area conveniently stiffened by thickened areas, raised edges, or protruding outer lips providing thereby for a perfect application of the shaped end of the tube onto a face of a flange of the articulation mechanism, these parts being thereafter connected together, junction studs of each flange of the articulation inclination being used for a respective centering of the part.

13 Claims, 4 Drawing Sheets

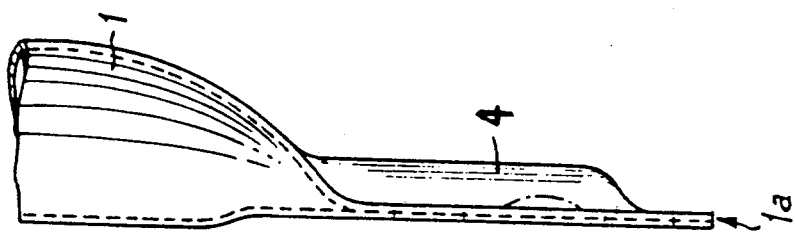
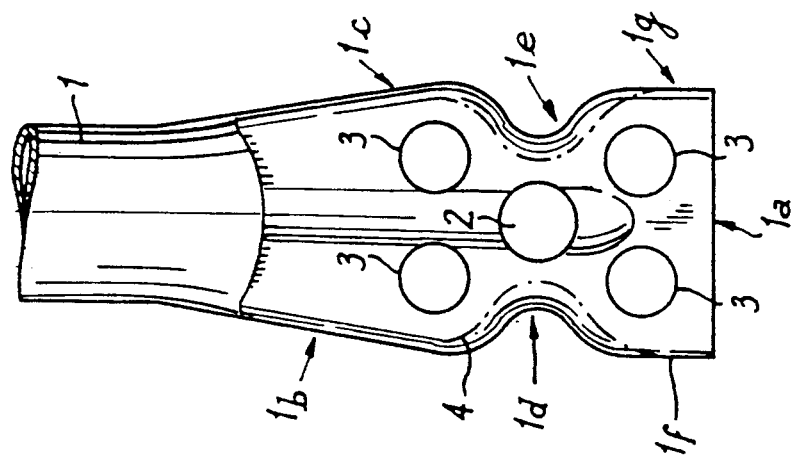
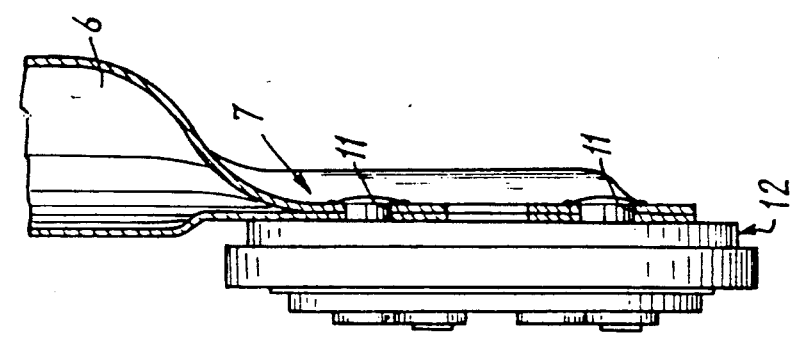
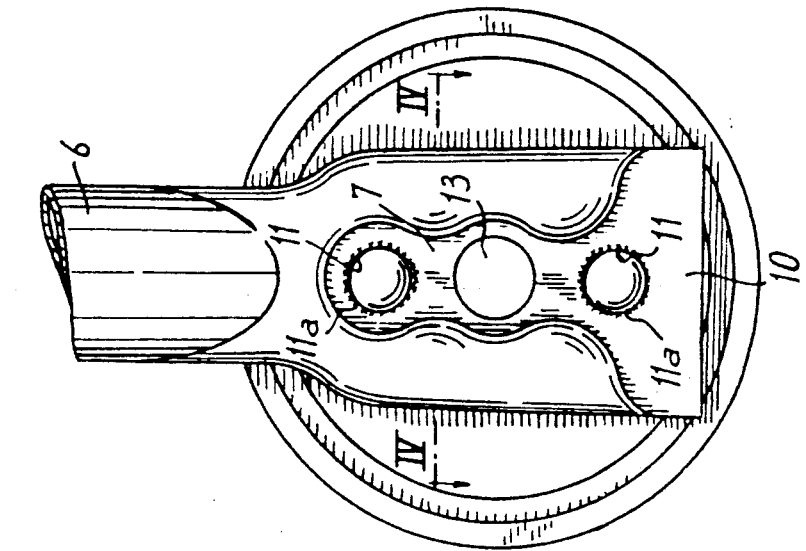
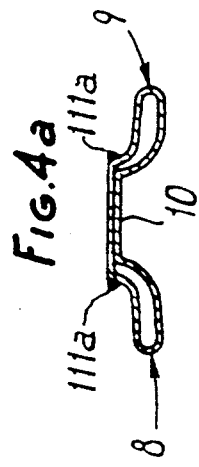

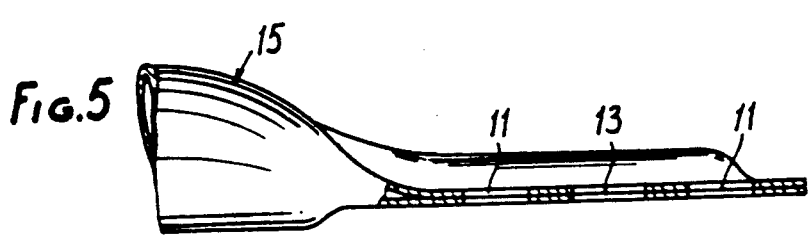
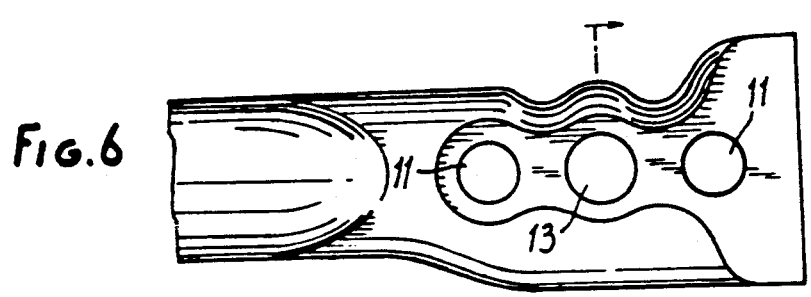
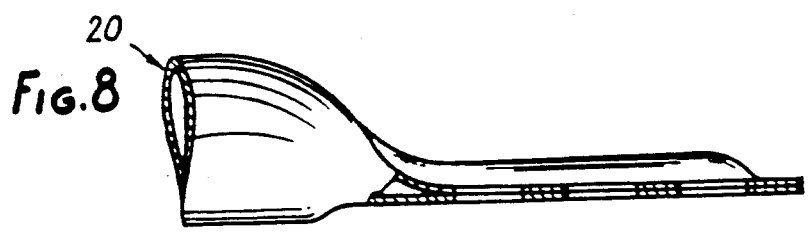
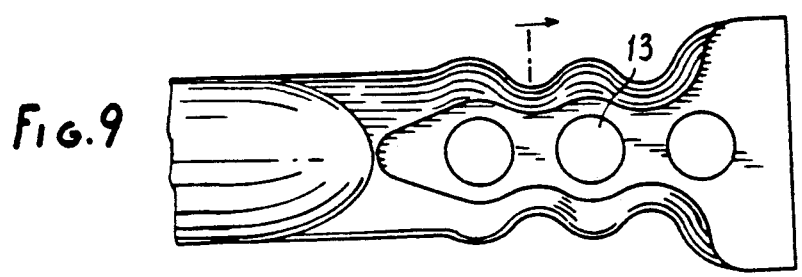
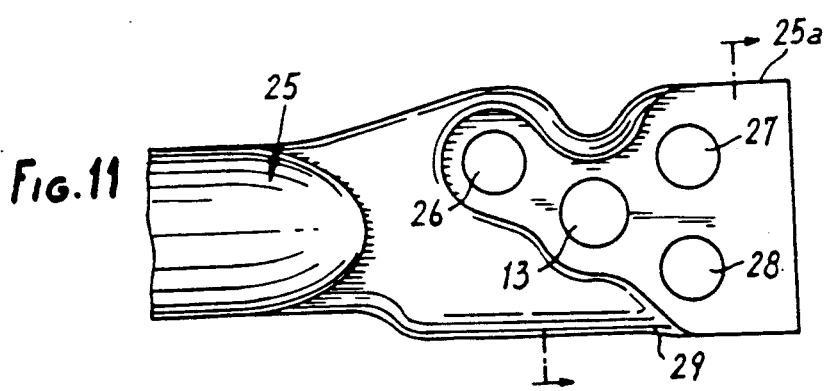
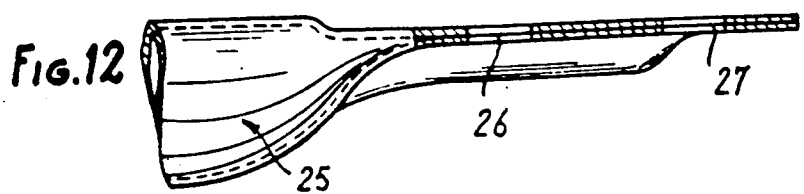
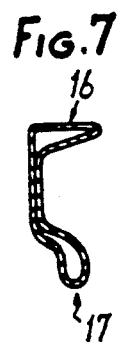
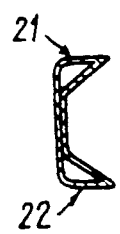

SHAPED JUNCTION PORTIONS OF TUBES OF AN ARTICULATED SEAT FRAME

This is a continuation-in-part application of co-pending parent application of U.S. Ser. No. 164,013—Pipon et al filed Mar. 4, 1988 and belonging to the assignee of the present invention.

BACKGROUND OF THE INVENTION

Seats for land, nautical and air vehicles, and above all seats used in motor vehicles, include now articulation mechanisms placed between the seat frame and the back frame for adjusting inclination of the backing portion with respect to the seating portion of the seat without clearance and with a great accuracy in order to provide the passengers as well as the driver of the vehicle with a maximum comfort avoiding fatigue.

BRIEF DESCRIPTION OF KNOWN PRIOR ART

U.S. Pat. No. 4,634,181—Pipon dated Jan. 6, 1987 and belonging to the assignee of the present invention discloses a round hinged-part for land, sea and air vehicle seats.

Articulation mechanisms having a very small cylindrical volume are already known since their thickness is very small and they have a diameter of a few centimeters. Such articulation mechanisms can therefore be adapted in a very simple way to seat frames made of metal sheet through fixing by various means on the seat frame one of the flanges of the articulation mechanism and on the lower portion of the back frame the other flange of the mechanism.

The junction of the articulation mechanism with a seat frame made of metal sheet does not therefore create difficulties, but the situation is quite different when the seat frame is tubular since, until now, it was necessary to fix on tube ends of such a tubular seat frame (and likewise on tube ends of the back frame) intermediate plates formed with flanges so as to thereafter position the articulation mechanism between the seating portion and the backing portion; but it is obvious that the positioning of complementary parts has many disadvantages. Namely:
  i) such an assembly is unsightly, bulky and therefore difficult to use in modern vehicles having a passenger space as reduced as possible;
  ii) these complementary parts have to be machined and sometimes subjected to a thermal treatment, hence a high cost price which has to be added to that of the normal equipment of the articulation mechanisms; and further
  iii) it is very difficult to provide perfectly symmetrical and correct assemblies on either side of the seat by adding connecting elements which, welded on the tube, cannot ensure a correct alignment of the mechanisms. In fact, the assembly positions and particularly the alignments of the driving squares, should not be modified by the fixation points situated on the fixed and mobile parts of the articulation mechanism. When it is not the case, it is not possible to position the control bar of the articulations with a machine in an automatic way since there is an angular offset of the squares. It is thus necessary to rely on a manual intervention in order to manually align the driving squares, thereby increasing the assembly looseness since the junction tube being welded on spots which are tangent its outer diameter, a twist moment is then obtained, which causes a greater sagging of the backing portion of the seat (by about the double).

OBJECTS OF THE INVENTION

The present inventive remedies these disadvantages by providing a shaped junction portion of the ends of the tubes of the seat and back frames such that each articulation mechanism for adjusting the inclination of the seat backing portion is directly mounted on the frames, thereby considerably reducing the cost price of the seat.

SUMMARY OF THE INVENTION

According to the invention, the shaped junction portion of a seat frame tube for fixation of an articulation adjusting mechanism between the seating portion and the backing portion of a seat is characterized in that each end of the seat and of the back frame is deformed typically by swaging in order to obtain a plane surface which is appropriately stiffened by thicker areas or protruding lips, thereby ensuring a perfect application of the shaped end of the tube on a face of a flange face of the articulation mechanism, these parts being thereafter connected together, junction studs of each flange of the articulation mechanism being used for a respective centering of the parts.

The ends of the tubes forming the seat and back frames, and the fixed and mobile flanges of the articulation mechanisms, are connected together by welding with a filler metal, by using the junction studs of each articulation mechanism and welding spots on the plane rear face of the shaped portion.

The flange/tube connections, according to some configurations of the end shapes of the tubes, enable also resorting to solutions using screw-nuts or rivets solid with the flanges. The strength of the tube is obtained by the fact that the flexural efforts pass through the tube axis and therefore prevent its twisting.

Various other features of the invention will become more apparent from the hereinafter detailed description.

BREIF DESCRIPTION OF THE DRAWINGS

Embodiments of the invention are shown by way of non limiting examples in the accompanying drawings, wherein:

FIG. 1 is a side elevational view of an example of the tube shaped end of a back frame of a seat;

FIG. 2 is a front view corresponding to FIG. 1;

FIG. 3 is a view that shows, partly in cross-section, a positioning of the tube shaped end on an articulation mechanism;

FIG. 4 is a plan view corresponding to FIG. 3;

FIG. 4a is a cross-sectional view substantially taken along line IV—IV of FIG. 4;

Figure 14:
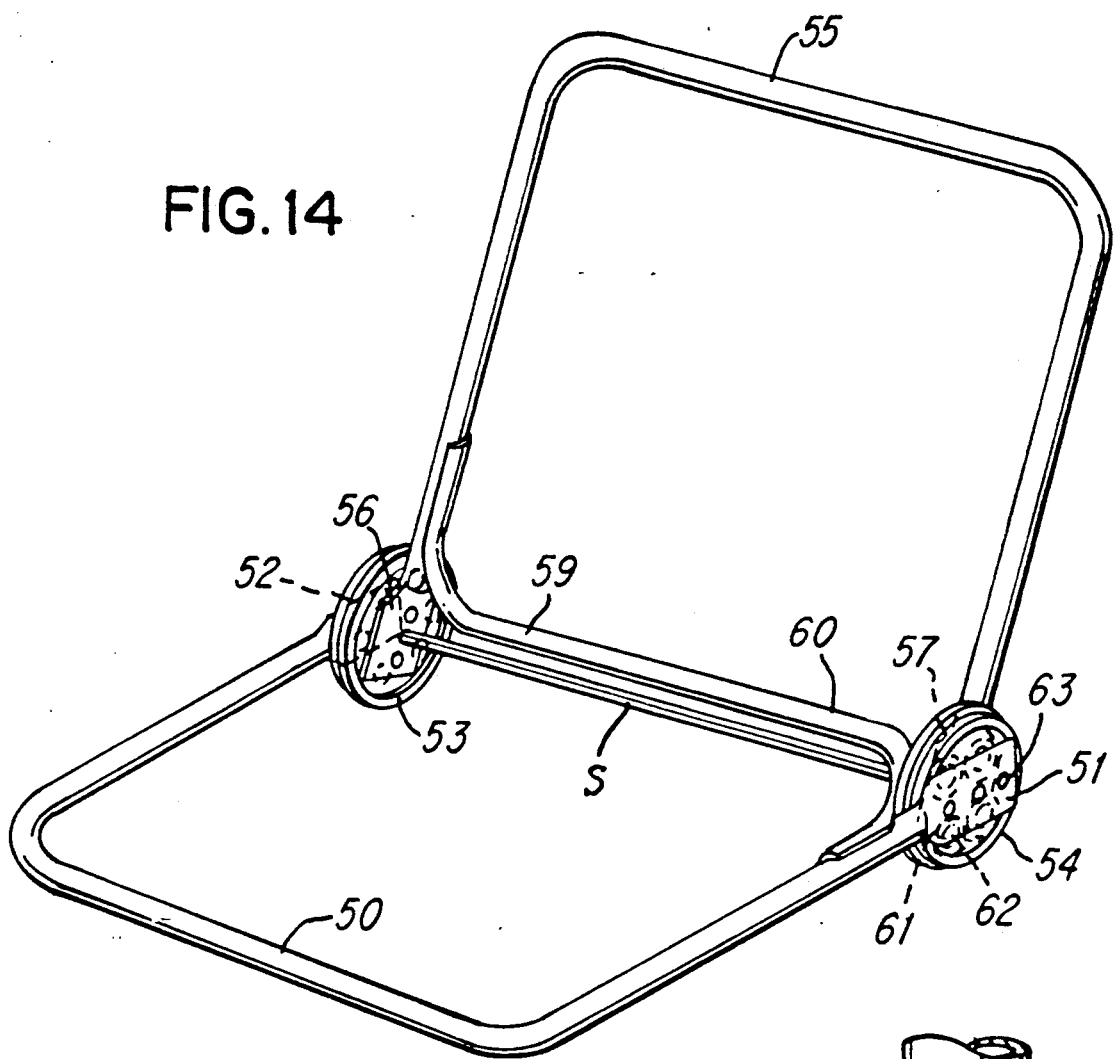
Figure 15:
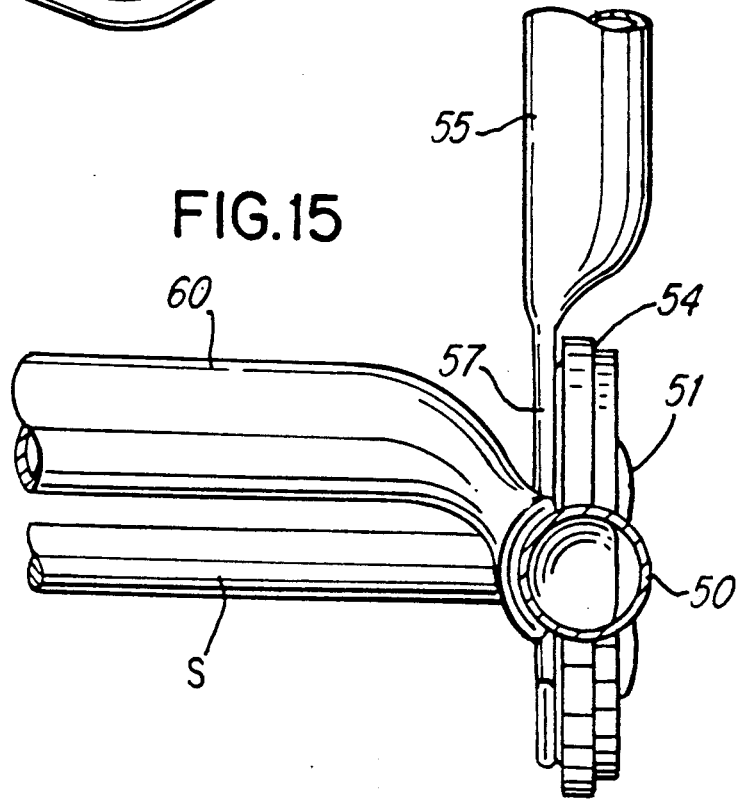
Figure 16:
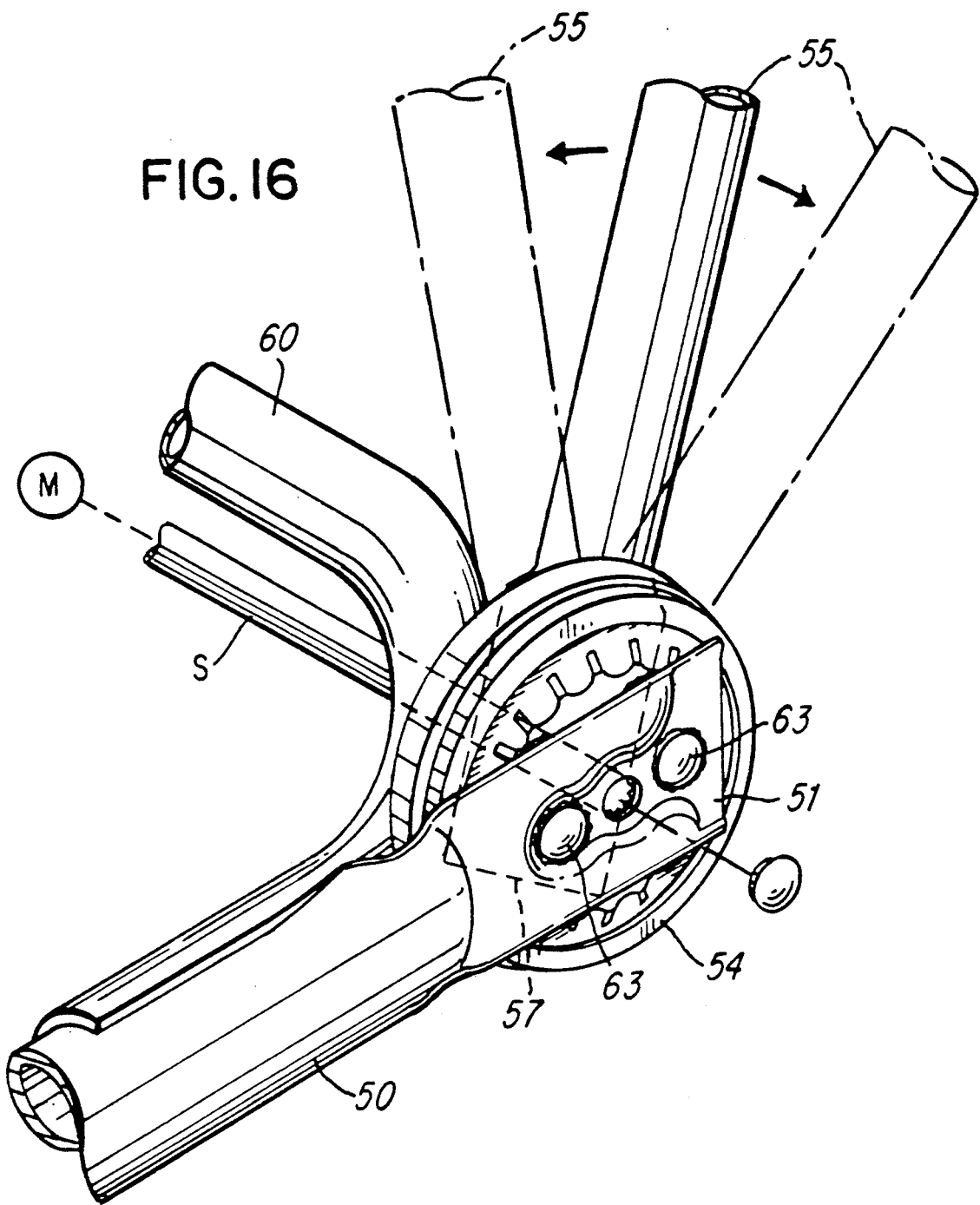

FIGS. 5, 6 and 7, respectively, show an elevation view, partly in cross-section, a plan view and a transverse cross-sectional view of another embodiment of the junction shaped portion of a tube of a seat or back frame used for its junction with an articulation mechanism;

FIGS. 8, 9 and 10, respectively, show an elevation view, partly in cross-section, a plan view and a transverse cross-sectional view of a third embodiment of the junction shaped portion of a tube of a seat or back frame;

FIGS. 11, 12 and 13 are, respectively, a plan view, a side elevation view partly in cross-section and a transverse cross-sectional view of a fourth embodiment of the junction shaped portion of a tube of a seat or back frame;

FIG. 14 is a perspective view of a partial tubular frame of a seat with its articulation mechanisms;

FIG. 15 is a front elevation view of an articulation mechanism fixed on one of the sides of the seat by the junction shaped portion of the tubes of the seat and back frames; and FIG. 16 is an enlarged perspective view similar to that of FIG. 14 and showing further details thereof more clearly.

DETAILED DESCRIPTION OF THE INVENTION

FIGS. 1 and 2 show the end of a tube 1 of round section of a back frame of a seat which has been subjected to a junction conformation by a working pass so as to form on the tube end 1a a widened flat area at the upper portion 1b, 1c which is narrowed in areas 1d, 1e, and then widened again in the end areas 1f, 1g.

As better shown in FIG. 2, a swaging of the lower end of the tube 1 allows structure to form holes 3 placed at predetermined locations for a junction of the tube end with one of the flanges of the articulation mechanism.

Moreover, there is provided in the narrowed area which is between the portions 1d and 1e, a circular passage 2 for positioning a control device for controlling the articulation mechanism or mechanisms.

FIG. 2 also shows thickened areas 4 provided for reinforcing the portion of the tube 1 to be adapted on one of the flanges of the articulation mechanism.

In FIGS. 3, 4 and 4a, the lower end of the tube shown at 6 is flattened at 7 so as to form two outer lips or raised edges 8 and 9 (FIG. 4a) which are not contiguous, while the central area 10 is brought back to the thickness of the walls of the tube 6, the central area 10 being formed with holes 11 as shown in FIGS. 3, 4 for passage of studs soldered at 11a and provided for fixation of the tube 6 on one of the flanges 12 of the articulation mechanism shown in FIGS. 3 and 4 of which internal structure can be taken to exist for example as disclosed by previously noted U.S. Pat. No. 4,634,181—Pipon dated Jan. 6, 1987, while a central opening 13 provides a passage of the shaft S of the single control of the articulation mechanism or mechanisms which can be actuated manually or can be driven by a motor M.

The flattened portion 10 with the raised edges 8, 9 defines an axis for the tube for obtaining a reduced flexural movement in that an inertia of the tube extends to beyond the axis of the articulation mechanisms.

As better shown in FIG. 4, in addition to the junction by welding 11a of the studs of one of the flanges of the articulation mechanism, welding spots 111a are provided on the rear face of the flattened portion 7. These weldings are made on the rear of the flattened area 7 so as to authorize a compressive working of the welding spots 111a which therefore offer a better strength.

Each central area 10 of said flattened portions defines an axis for its tube for obtaining a reduced flexural movement in that an inertia of the tube extends beyond an axis of an articulation. The flattened portions contribute to maintaining a closing ring of each articulation mechanism by cancelling abnormal efforts or forces caused in this area by the back portion.

In the embodiment of FIGS. 5-7, the end of the tube shown at 15 has been conformed in a manner substantially similar to that of FIGS. 3 and 4, but a lip 16 (see FIG. 7) is provided perpendicularly to the junction plane of the walls of the tube 15 with the articulation mechanism, while a lip 17 tends to extend parallel to the median plane of the articulation mechanism.

In FIGS. 8 to 10, the end of the tube shown at 20 is shaped so as to have two vertical lips 21, 22 (FIG. 10) perpendicular to the junction plane of the tube walls with respect to the articulation mechanism.

Moreover, and as shown, the thinned out central plane portion of the junction area of the tube walls forms reinforcement lips.

Finally, FIGS. 11-13 show an asymmetrical disposition of the flattened end of the tube shown at 25 so that the junction with the flange in consideration of the articulation mechanism is made at three points 26, 27, 28, the central opening 13 being provided for the passage of the single and combined control of the two articulation mechanisms. This is even more visible since FIG. 13 shows a bulge 25a and an asymmetrical protruding lip 29 providing, due to its position, a lateral reinforcement for the flattened end of the tube 25.

In FIG. 14, the seat frame 14 is schematically shown by a tubular stirrup-shaped part or bow 50 with its free ends 51 and 52 being flattened, for example into a shape close to that shown in FIG. 4. As in the case of FIG. 4, the articulation mechanisms 53, 54 are thereby fixed by their outer fixed flanges onto the bow 50. Likewise, a bow 55 forming the back frame has also flattened ends 56, 57 which are fixed onto the inner mobile flange of each articulation mechanism 53, 54. As better shown in FIG. 15, there are provided horizontal tubes 59, 60, with the tube 59 forming a lower reinforcement of the backing portion and the tube 60 forming a transverse reinforcement of the seating portion, thereby perfectly stiffening the seat frame in the area of the articulation mechanisms 53, 54. In this respect, the flat portions 1a to 1g (FIG. 2), 10 (FIG. 4a) and 25 (FIG. 13) assist in maintaining the closing ring of the mechanism and prevent it from unwinding when abnormal effects or forces are applied to the backing portion and thereby enhance security.

As shown in FIGS. 14, 15 and 16, the connection between the flanges of the articulation mechanism 53, 54 and the flattened frame portion ends is provided by at least one of the following: a screw 62 and a nut 61, rivets 63 and other members secured to these flanges.

The flattened portion 1a, 1g, 10 and 25 assists in maintaining a closing ring of the articulation mechanism by a cancellation of abnormal efforts in this area which are caused by the backing portion.

All the above described embodiments permit an arrangement to considerably increase the rigidity of the tube, most often made of sheet metal, and in a manner making it possible to definitely omit the inner lining generally used for connections of a cylindrical tube with a flat area since, although the tubes 1, 6, 15, 20, 25, 50 and 55 used in the junction shaped portions are not treated, a twisting phenomenon of the tube is eliminated due to the proposed shape of each embodiment, thereby affording a definite advantage due to a compressive stress and, with welds by a filler metal, soldering, plug, etc., a gain in weight, an easy connection for centering the openings 2, 13 in perfect alignment, authorizing an automatic assembly of the control members of the articulation mechanism and thereby considerably increasing the accuracy and therefore avoiding plays in the articulation area between the seating and backing portions.

The present invention remedies the mentioned disadvantages and overcomes the problem by providing means so that each articulation mechanism is directly mounted on the frame, thereby substantially reducing the cost or price of components and parts involved therewith.

A problem has been solved by the features of the present invention as to how to directly mount, on a tubular frame, a circular articulation mechanism having various positioning means, either continuous or discontinuous. The articulation mechanism 12 is then added part and not an integral part of the flange.

In the present inventive arrangement and because of the shaped end of the tubing, it is not necessary to use any complementary part.

An attempt may be made to connect the tubing to a plate member by forming flattened portions reinforced with integral stiffening means on the tubing itself but not being reinforced via an integral part of the flanges thus serving effectively as stiffening means integrally flanged therewith in accordance with the present invention.

According to the known prior art, provision can be made for mounting an articulation mechanism on a tubular frame when it is then necessary to secure, on the tube ends of such tubular seat frame (and likewise on the tube ends of such tubular back frames) an intermediate plate having flanges so as to make possible thereafter a positioning of the articulation mechanism between the seat portion and the back portion. Using such a complementary part has many disadvantages.

In the present invention, a circular articulation mechanism is mounted directly on a tubular frame without any complementary part, by flattening the ends of the tubular frame.

The present invention is, of course, in no way restricted to the specific disclosure of the specification and drawings, but also encompasses any modifications within the scope of the appended claims.

What we claim is:

1. In the shaped junction portions of tubes of a seat frame that includes a seat portion and a back portion, with articulation adjusting mechanisms being fixed between ends of said tubes, the improvement wherein:
   each of said ends of said tubes of said frame portions, in order to form a junction portion, is provided with a flattened portion that is reinforced via part of flanges of said articulation adjusting mechanisms, and serves as stiffening means, with each of said flattened portions being connected to one of said flanges of said articulation adjusting mechanism, each of which is mounted directly on said frame via said flattened portions, with said articulation adjusting mechanisms being provided with means for effecting positioning thereof; and
   said stiffening means of each of said flattened portions is in the form of protruding lips, whereby each of said flattened portions is disposed between two of said lips, the planes of which essentially extend parallel to the plane of said flattened portion.

2. Shaped junction portions in combination according to claim 1, in which each of said flanges of said articulation mechanisms is provided with junction stud means for providing centering action between said flanges and said flattened junction portions.

3. Shaped junction portions in combination according to claim 1, in which said connection between said flanges of said articulation mechanisms and said flattened frame portion ends is effected by at least one of the following: welding with a filler metal, use of junction studs of said articulation mechanisms, and welding spots on end face means of said flattened portions.

4. Shaped junction portions in combination according to claim 1, in which said connection between said flanges of said articulation mechanisms and said flattened frame portion ends is provided by at least one of the following: screws and nuts, rivets, and other securing members secured to said flanges.

5. Shaped junction portions in combination according to claim 1, wherein said articulation adjusting mechanisms are mounted directly on the frame to reduce the number of parts and cost.

6. Shaped junction portions in combination according to claim 5, wherein said means for various positioning is manually operable.

7. Shaped junction portions in combination according to claim 5, wherein said means for various positioning is motor operable.

8. Shaped junction portions in combination according to claim 5, wherein said means for various positioning includes a shaft that passes centrally through said articulation adjusting mechanisms.

9. Shaped junction portions according to claim 1, in which said stiffening means of said flattened portion further include thickened areas.

10. In the shaped junction portions of tubes of a seat frame that includes a seat portion and a back portion, with articulation adjusting mechanisms being fixed between ends of said tubes, the improvement wherein:
    each of said ends of said tubes of said frame portions, in order to form a junction portion, is provided with a flattened portion that is reinforced via part of flanges of said articulation adjusting mechanisms, and serves as stiffening means, with each of said flattened portions being connected to one of said flanges of said articulation adjusting mechanisms, each of which is mounted directly on said frame via said flattened portions, with said articulation adjusting mechanisms being provided with means for effecting positioning thereof; and
    said stiffening means of each of said flattened portions is in the form of protruding lips, whereby each of said flattened portions is disposed between two of said lips, the plane of one of which extends essentially parallel to the plane of said flattened portion, and the plane of the other of which extends essentially perpendicular to the plane of said flattened portion.

11. Shaped junction portions according to claim 10, in which said stiffening means of said flattened portion further include thickened areas.

12. In the shaped junction portions of tubes of a seat frame that includes a seat portion and a back portion, with articulation adjusting mechanisms being fixed between ends of said tubes, the improvement wherein:
    each of said ends of said tubes of said frame portions, in order to form a junction portion, is provided with a flattened portion that is reinforced via part of flanges of said articulation adjusting mechanisms, and serves as stiffening means, with each of said flattened portions being connected to one of said flanges of said articulation adjusting mechanisms, each of which is mounted directly on said frame via said flattened portions, with said articulation adjusting mechanisms being provided with means for effecting positioning thereof; and said stiffening means of each of said flattened portions is in the form of protruding lips and bulges, whereby each of said flattened portions is disposed between one of said bulges and one of said lips, the configuration of which lip extends essentially upwardly and then parallel to the plane of said flattened portion.

13. Shaped junction portions according to claim 12, in which said stiffening means of said flattened portion further include thickened areas.

* * * * *